A. W. STAFFORD.
AUTOMATIC FIRE ALARM.
APPLICATION FILED FEB. 26, 1909.
947,423.
Patented Jan. 25, 1910.
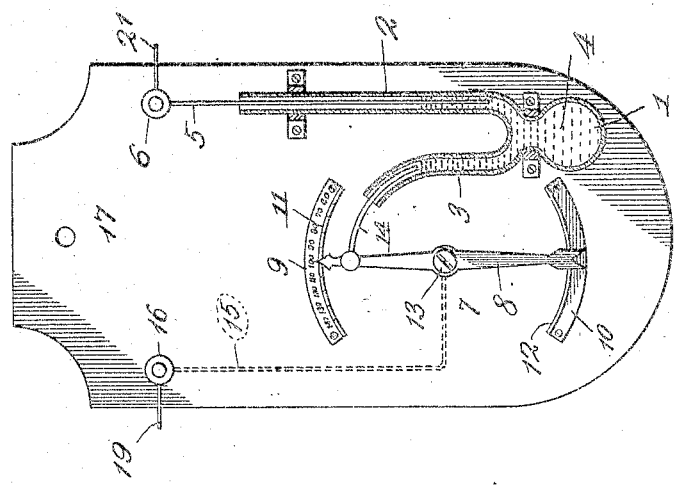
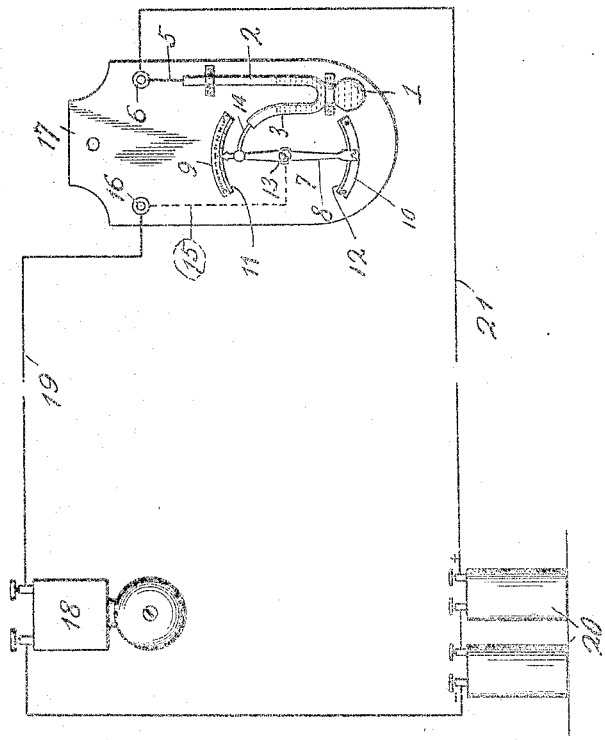
Witnesses:
R. E. Hamilton.
M. Cox.
Inventor
Allen W. Stafford,
By F. G. Fischer, Atty.

UNITED STATES PATENT OFFICE.

ALLEN W. STAFFORD, OF IOLA, KANSAS.

AUTOMATIC FIRE-ALARM.

947,423.  Specification of Letters Patent.  Patented Jan. 25, 1910.

Application filed February 26, 1909. Serial No. 480,282.

*To all whom it may concern:*

Be it known that I, ALLEN W. STAFFORD, a citizen of the United States, residing at Iola, in the county of Allen and State of Kansas, have invented certain new and useful Improvements in Automatic Fire-Alarms, of which the following is a specification.

My invention relates to automatic fire alarms, and my object is to produce a simple and reliable device of this character which may be set to sound the alarm at any predetermined degree of temperature.

The invention embraces a thermostat, an annunciator or alarm, and an electric circuit or connections whereby whenever the fluid in the thermostat attains the maximum point to which said thermostat may be set, the circuit will be completed through the annunciator or alarm, which otherwise remains inoperative.

In the accompanying drawing, which illustrates the invention: Figure 1 represents a diagram of the alarm ready for operation. Fig. 2 is a front elevation partly in section of the thermostat and an adjustable indicator forming important features of the invention.

In carrying out the invention, I employ a thermostat consisting of a bulb 1, tubes 2 and 3 communicating with said bulb, and an electrical conducting-fluid 4, consisting preferably of mercury. The bulb and tubes consist preferably of glass or other non-conducting material, and the upper end of tube 3 is curved for a purpose which will hereinafter appear.

5 designates a contact leading from a binding-post 6 into tube 2 and the fluid contained thereby.

7 designates an indicator comprising a pointer 8, a scale 9, and a segment 10. Scale 9 and segment 10 have outturned flanges 11 and 12, respectively, against which the pointer is clamped by a screw 13, upon which said pointer is pivotally-mounted, so that when the screw is loosened, the pointer may be adjusted to any degree on the scale 9.

Pointer 8 is provided at its upper portion with a segmental arm 14, which extends into the upper curved portion of tube 3, its inner end being adjusted the desired distance from the upper surface of the fluid by the proper manipulation of pointer 8.

15 designates a conductor leading from screw 13 to a binding-post 16.

17 designates a board upon which the thermostat, the indicator, and the binding-posts are mounted.

18 designates an alarm connected to the binding-post 16 through a wire 19.

20 designates a battery, or other source of electrical energy, connected to the alarm 18 and the binding post 6 by a wire 21.

In practice the inner end of arm 14 is adjusted the desired distance from the fluid in tube 3 by properly manipulating pointer 8, it being understood that the sensitiveness of the thermostat will be greater or less in proportion to the space between the end of arm 14 and the fluid. When the temperature rises to the predetermined degree at which the indicator is set, the fluid will be expanded through the medium of said rising temperature, submerge the adjacent terminal of arm 14 and close the circuit, so that the alarm will be sounded and remain active until the temperature falls below normal, when the circuit will be interrupted and render the alarm inactive by the fluid receding and exposing the inner terminal of the arm 14.

The alarm may be placed any desired distance from the thermostat, and a number of the latter may be located in different portions of the building where fires are liable to originate, and connected to one alarm, which may be located outside of the building if desired.

Having thus described my invention, what I claim is:—

1. An automatic alarm consisting of a thermostat having two fluid-containing tubes, one of said tubes being curved at its upper end, a fixed contact having one end submerged in the fluid in the other tube, a pointer pivotally mounted adjacent the thermostat and provided with a curved arm adapted to be adjusted close to the fluid in the curved tube, a scale against which the pointer is adapted to be locked, and a circuit containing an alarm which is sounded when the fluid contacts with the curved arm.

2. An automatic alarm consisting of a thermostat having two fluid-containing tubes, one of said tubes being curved, a fixed contact having one end submerged in the fluid in the other tube, a pointer pivotally mounted adjacent to the thermostat and provided with a curved arm adapted to be adjusted close to the fluid in the curved tube, a segment having an outturned flange, a scale having an outturned flange, means for binding the indicator against said outturned flanges, and a circuit containing an alarm which is sounded when the fluid contacts with the curved arm.

In testimony whereof I affix my signature, in the presence of two witnesses.

ALLEN W. STAFFORD.

Witnesses:
L. E. VANATTA,
J. H. HENDERSON.